Patented Nov. 21, 1933

1,936,488

UNITED STATES PATENT OFFICE 1,936,488

PROCESS OF PREPARING SUBSTITUTED PYRAZOLONES

Hans Stenzl, Basel, Switzerland, assignor to Hoffmann-La Roche Inc., Nutley, N. J., a corporation of New Jersey No Drawing. Application September 7, 1932, Serial No. 632,083, and in Germany September 7, 1931

8 Claims. (Cl. 260—45)

1-phenyl-3-methyl-4-alkyl-pyrazolones and the respective aralkyl-pyrazolones are by the usual methods only to a limited extent obtainable from the mono-alkyl-acetic esters, because the mono-alkylating of the acetic esters only gives satisfactory yields with the lowest members of the group. Likewise the mono-alkylating of 1-phenyl-3-methyl-pyrazolone in 4-position does not take a uniform course.

It has now been found, that the alkylidene and aralkylidene derivatives of 1-phenyl-3-methyl-pyrazolones obtained from aldehydes and ketones according to Knorr (Annalen der Chemie 238, 1887, page 181) may be converted into the 4-alkyl- and 4-aralkyl-pyrazolones without damage to the double combination present in the pyrazolone nucleus by catalytic hydrogenation. The 1-phenyl-3-methyl-4-alkyl- and -4-aralkyl-pyrazolones are obtained according to this method in very pure form and in very good yield.

It is particularly advantageous to hydrogenate the alkylidene and aralkylidene pyrazolones in the moment of their formation from pyrazolone and an aldehyde or ketone, that is to say to carry out the condensation and hydrogenation simultaneously. The condensation of 1-phenyl-3-methyl-pyrazolone with an aldehyde or ketone does not take a uniform course. By condensation with acetone for instance it cannot be prevented that a rather large part of the starting material is converted into the isopropylidene-(bis-phenyl-methyl-pyrazolone). The reaction with the homologues of acetone is still more unfavorable. If however the 1-phenyl-3-methyl-pyrazolone is heated with an aldehyde or ketone in the presence of hydrogen and a hydrogenation catalyst, 1-phenyl-3-methyl-4-alkyl- or -4-aralkyl-pyrazolone is obtained as sole reaction product and the yield is almost quantitative.

Knorr (Annalen der Chemie, 238, 1887, page 181) obtained from 1-phenyl-3-methyl-4-benzylidene-pyrazolone with zinc powder and acetic acid a compound which, without further investigation, he took to be 1-phenyl-3-methyl-4-benzyl-pyrazolone. It has been found however, that by reduction of 1-phenyl-3-methyl-4-benzylidene-pyrazolone with zinc powder and acetic acid a compound soluble in a solution of sodium hydroxide is actually obtained, but that this compound is amorphous and has quite different properties from 1-phenyl-3-methyl-4-benzyl-pyrazolone.

The 1-phenyl-3-methyl-4-alkyl- and -4-aralkyl-pyrazolones form well crystallized compounds which, when heated, are easily soluble in organic solvents, such as ethyl- and methyl-alcohol, acetone, less easily soluble at normal temperature. In ether they are also easily soluble. In water they are hardly soluble. They dissolve in dilute alkali, from which they are again precipitated with acids. The new compounds are to be used as intermediates for the preparation of medicines.

Example 1

10 parts of 1-phenyl-3-methyl-4-isopropylidene-pyrazolone are dispersed in 50 parts of alcohol, heated in hydrogen under pressure of 10 atmospheres with the addition of a nickel catalyst and while constantly stirring to 80–100° C., until no more hydrogen is taken up, then filtered from the catalyst; the greater part of the solvent is evaporated and water added to the residue. About 10 parts of 1-phenyl-3-methyl-4-isopropyl-pyrazolone are precipitated. By re-crystallization from acetone or alcohol the compound is obtained absolutely pure in the shape of colourless needles melting at 117–119° C.

Example 2

20 parts of 1-phenyl-3-methyl-4-sec.-butylidene-pyrazolone (obtained by condensation of 1-phenyl-3-methyl-pyrazolone with ethyl-methyl-ketone, yellow prisms melting at 85° C.) in 100 parts of ethyl-methyl-ketone with a nickel catalyst are treated so long at 100° C. with hydrogen under 5–10 atmospheres, until the calculated quantity of hydrogen has been taken up. The reaction product is filtered from the catalyst, the solvent evaporated at reduced pressure, the residue taken up with ether, the ether shaken with dilute solution of sodium hydroxide and the 1-phenyl-3-methyl-4-sec.butyl-pyrazolone precipitated from the strongly dilute and cooled alkaline solution with acetic acid. About 20 parts of a quickly congealing oil are obtained, which after drying may be crystallized from acetone 70% and then forms colourless flakes melting at 92° C.

Example 3

35 parts of 1-phenyl-3-methyl-pyrazolone are dispersed in 70 parts of cyclohexanone, a nickel catalyst is added and the reaction product then heated with hydrogen under pressure of 10 atmospheres while constantly stirring to 100–120°C. After about half an hour 110–120% of the calculated quantity of hydrogen are taken up. The product is cooled and treated in the manner described in Example 1. The 1-phenyl-3-methyl-4-cyclohexyl-pyrazolone is obtained in quantitative yield, and, re-crystallized from methyl-alcohol, forms colourless flakes melting at 130–132° C.

Example 4

20 parts of 1-phenyl-3-methyl-pyrazolone are dispersed in 40 parts of acetone and after the addition of a nickel catalyst heated under pressure of 10 atmospheres with hydrogen to 110–120° C. When the reaction is terminated, the hot product is filtered from the catalyst. From the cooling solution 1-phenyl-3-methyl-4-isopropyl-pyrazolone crystallizes in pure form and in excellent yield.

Example 5

20 parts of 1-phenyl-3-methyl-pyrazolone are dispersed in 40 parts of benzaldehyde. The product is then heated with hydrogen under pressure of 10 atmospheres in the presence of a nickel catalyst to 110–120° C., until 110–120% of the calculated quantity of hydrogen have been taken up, then filtered from the catalyst, diluted with ether and shaken with a 5% solution of sodium hydroxide. By acidifying with acetic acid the 1-phenyl-3-methyl-4-benzyl-pyrazolone is precipitated in quantitative yield. When crystallized from methyl-alcohol, it melts at 140–142° C.

Example 6

A suspension of 20 parts of 1-phenyl-3-methyl-pyrazolone in 40 parts of isobutyl-aldehyde is, after addition of a nickel catalyst, heated with hydrogen under pressure of 10 atmospheres to 110–120° C., until about 120% of the calculated quantity of hydrogen have been taken up. The product is then filtered from the catalyst, diluted with ether, shaken with a dilute solution of sodium hydroxide and the 1-phenyl-3-methyl-4-isobutyl-pyrazolone precipitated from the strongly dilute, ice-cold alkaline solution with acetic acid. By triturating with ether and re-crystallization from dilute methyl-alcohol the compound thus obtained is purified. It crystallizes in coarse prisms melting at 118–119° C.

I claim:

1. A process for the manufacture of compounds of the general type

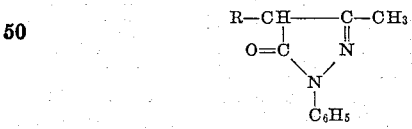

where R is a radical selected from the group which consists of alkyl radicals, cyclohexyl and benzyl, which consists in hydrogenating a compound of the general type

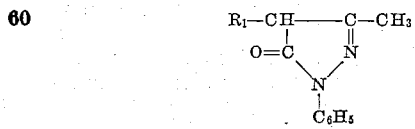

where R₁ is a radical selected from the group which consists of alkylidene radicals, cyclohexilidene and benzylidene, in the presence of a hydrogenation catalyst at an increased temperature and pressure.

2. A process for the manufacture of compounds of the general type

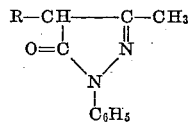

where R is a radical selected from the group which consists of alkyl radicals, cyclo-hexyl and benzyl, which consists in hydrogenating a compound of the general type

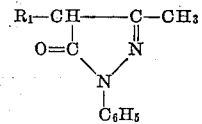

where R₁ is a radical selected from the group which consists of alkylidene radicals, cyclo-hexilidene and benzylidene, in the presence of a nickel catalyst at an increased temperature and pressure.

3. A process for the manufacture of compounds of the general type

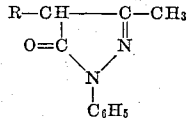

where R is a radical selected from the group which consists of alkyl radicals, cyclo-hexyl and benzyl, which consists in condensing 1-phenyl-3-methyl pyrazolone with a compound selected from the group which consists of aliphatic aldehydes, aliphatic ketones, benzaldehyde, and cyclohexanone and simultaneously hydrogenating the reaction product in the presence of a hydrogenation catalyst at an increased temperature and pressure.

4. A process as claimed in claim 3 in which the hydrogenation catalyst is a nickel catalyst.

5. A process for the manufacture of 1-phenyl-3-methyl-4-isopropyl pyrazolone which consists in hydrogenating 1-phenyl-3-methyl-4-isopropylidene pyrazolone in the presence of a hydrogenation catalyst at an increased temperature and pressure.

6. A process for the manufacture of 1-phenyl-3-methyl-4-isopropyl pyrazolone which consists in hydrogenating 1-phenyl-3-methyl-4-isopropylidene pyrazolone in the presence of a nickel catalyst at an increased temperature and pressure.

7. A process for the manufacture of 1-phenyl-3-methyl-4-isopropyl pyrazolone which consists in condensing 1-phenyl-3-methyl-pyrazolone with acetone and simultaneously hydrogenating the reaction product in the presence of a hydrogenation catalyst at an increased temperature and pressure.

8. A process for the manufacture of 1-phenyl-3-methyl-4-isopropyl pyrazolone which consists in condensing 1-phenyl-3-methyl pyrazolone with acetone and simultaneously hydrogenating the reaction product in the presence of a nickel catalyst at an increased temperature and pressure.

HANS STENZL.